United States Patent
Wei et al.

(10) Patent No.: US 11,150,920 B2
(45) Date of Patent: Oct. 19, 2021

(54) 3D API REDIRECTION FOR VIRTUAL DESKTOP INFRASTRUCTURE

(71) Applicant: VMware, Inc., Palo Alto, CA (US)

(72) Inventors: Yuping Wei, Beijing (CN); Ke Xiao, Vancouver (CA); Kejing Meng, Pittsburgh, PA (US); Qiao Huang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 294 days.

(21) Appl. No.: 15/990,551

(22) Filed: May 25, 2018

(65) Prior Publication Data

US 2019/0361718 A1 Nov. 28, 2019

(51) Int. Cl.
 G06F 9/451 (2018.01)
 G06F 9/54 (2006.01)
 G06F 9/455 (2018.01)

(52) U.S. Cl.
 CPC .......... *G06F 9/452* (2018.02); *G06F 9/45558* (2013.01); *G06F 9/547* (2013.01)

(58) Field of Classification Search
 None
 See application file for complete search history.

(56) References Cited

U.S. PATENT DOCUMENTS

| | | | | |
|---|---|---|---|---|
| 2004/0184470 A1* | 9/2004 | Holden | ................... | H04L 49/25 370/412 |
| 2008/0313406 A1* | 12/2008 | Kristensen | .......... | G06F 11/3471 711/128 |
| 2009/0183110 A1* | 7/2009 | Murtagh | ................. | G06F 9/451 715/803 |
| 2010/0030862 A1* | 2/2010 | Chen | ....................... | H04L 67/02 709/206 |
| 2010/0138827 A1* | 6/2010 | Frank | .................. | G06F 9/45558 718/1 |
| 2010/0169407 A1* | 7/2010 | Hsueh | ....................... | G06F 9/52 709/203 |
| 2011/0004839 A1* | 1/2011 | Cha | ......................... | G06F 9/451 715/765 |
| 2012/0005269 A1* | 1/2012 | Janssen | ................. | G06F 3/0481 709/203 |
| 2012/0131496 A1* | 5/2012 | Goossens | ................ | G06F 9/451 715/784 |

(Continued)

OTHER PUBLICATIONS https://blogs.vmware.com/euc/2014/07/vmware-horizon-view-graphics-acceleration-virtual-desktop-vdga-vsga-3d-soft.html.

(Continued)

*Primary Examiner* — Meng Ai T An
*Assistant Examiner* — Zujia Xu (57) ABSTRACT

Techniques for implementing 3DI API redirection for VDI desktops are provided. In one set of embodiments, a server system can intercept a call to a 3D API made by a 3D application running within a VM on the server system, where the VM hosts a desktop that is presented to a user of a client system. The server system can determine metadata associated with the call, where the metadata including a name of the 3D API and one or more input parameter values to the call, and can transmit the metadata to the client system. In response, the client system can reconstruct the call to the 3D API using the metadata and execute the call using one or more physical GPUs residing on the client system.

19 Claims, 6 Drawing Sheets

(56) References Cited

U.S. PATENT DOCUMENTS

| | | | | |
|---|---|---|---|---|
| 2012/0154389 | A1* | 6/2012 | Bohan | G06F 9/5044 |
| | | | | 345/419 |
| 2012/0242692 | A1* | 9/2012 | Laubach | G06F 3/04883 |
| | | | | 345/629 |
| 2014/0059114 | A1* | 2/2014 | Kim | H04L 67/42 |
| | | | | 709/203 |
| 2015/0263976 | A1* | 9/2015 | Tsukernik | H04L 47/70 |
| | | | | 709/226 |
| 2015/0281297 | A1* | 10/2015 | Chamberlin | G06F 21/10 |
| | | | | 709/219 |
| 2018/0285416 | A1* | 10/2018 | Bestfleisch | G06F 16/24542 |
| 2019/0026131 | A1* | 1/2019 | Yan | G06F 9/445 |
| 2019/0096027 | A1* | 3/2019 | Fielding | G06T 15/005 |

OTHER PUBLICATIONS http://images.nvidia.com/content/grid/vmware/horizon-with-grid-vgpu-faq.pdf.
https://www.citrix.com/products/xenapp-xendesktop/hdx-3d-pro.html.
https://technet.microsoft.com/en-us/library/ff817578(v=ws.10).aspx.
https://aws.amazon.com/workspaces/pricing/.
https://www.opengl.org/.
https://www.opengl.org/sdk/docs/man2/xhtml/glDrawElements.xml.
https://en.wikipedia.org/wiki/Snappy_(compression).
https://www.opengl.org/sdk/tools/ShaderDesigner/.
http://mupen64.emulation64.com/.

* cited by examiner

3D API REDIRECTION FOR VIRTUAL DESKTOP INFRASTRUCTURE

BACKGROUND

Virtual Desktop Infrastructure (VDI) is a technology that allows a user's desktop computing environment (i.e., "desktop") to be hosted remotely within a virtual machine (VM) running on a server system, rather than locally on the user's computer system. When the user wishes to access his/her desktop, the user's computer system (referred to herein as a "client system") connects to the server system using a remoting protocol. The server system then initiates (or resumes) execution of the user's desktop within the server-side VM and communicates, via the remoting protocol, with the client system in a manner that enables the user to view and interact with the desktop, in real-time or near real-time, from the client side.

Three-dimensional (3D) graphics acceleration is becoming an increasingly important feature for VDI deployments as more and more VDI users are moving towards using 3D graphics-intensive desktop applications. Examples of such applications include computer-assisted design (CAD) applications, 3D visualization tools, and 3D game development tools. One known approach for implementing 3D graphics acceleration in a VDI environment involves using the main central processing units (CPUs) of the server system to execute 3D rendering tasks for the desktops hosted on the server. An example of this approach is VMware's SoftGPU. Unfortunately, this CPU-based approach provides relatively poor performance and limited feature set compatibility with modern 3D graphics APIs because most server-grade CPUs are not specifically designed or optimized for 3D graphics rendering.

Another known approach for implementing 3D acceleration in a VDI environment involves leveraging physical graphics processing units (GPUs) installed on the server system to execute 3D rendering tasks. Examples of this approach include vSGA (Virtual Shared Graphics Acceleration), vDGA (Virtual Dedicated Graphics Acceleration), and vGPU (Virtual Graphics Processing Unit). This approach provides significantly better rendering performance that the CPU-based approach, but can be costly due to the need to procure and deploy a substantial amount of GPU hardware on each server system (potentially one GPU per VDI VM/desktop, depending on the implementation). This cost can be prohibitive for VDI deployments that need to serve a large number of concurrent users.

SUMMARY

Techniques for implementing 3DI API redirection for VDI desktops are provided. In one set of embodiments, a server system can intercept a call to a 3D API made by a 3D application running within a VM on the server system, where the VM hosts a desktop that is presented to a user of a client system. The server system can determine metadata associated with the call, where the metadata including a name of the 3D API and one or more input parameter values to the call, and can transmit the metadata to the client system. In response, the client system can reconstruct the call to the 3D API using the metadata and execute the call using one or more physical GPUs residing on the client system.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques—collectively referred to herein as "3D API redirection"—for leveraging GPU hardware resident on a client system to accelerate the rendering of 3D graphics in a VDI desktop. Generally speaking, these techniques involve intercepting, by a server-side VM running the VDI desktop, 3D API calls made by a 3D desktop application and transmitting metadata pertaining to the intercepted 3D API calls to the client system. Upon receiving this metadata, the client system can reconstruct the 3D API calls and pass them to a client-side GPU driver, which can execute the API calls using the client system's physical GPU(s). In cases where a called 3D API outputs a return value, the client system can also transmit the API's return value back to the server system, thereby completing the API's execution cycle.

With 3D API redirection, good 3D rendering performance can be achieved for VDI desktops, without the server-side capital costs necessitated by vSGA, vDGA, vGPU, and other server GPU-based approaches. In certain embodiments, in addition to the general redirection idea described above, various enhancements and optimizations can be implemented that further improve the performance, compatibility, and efficiency of the overall solution. These and other aspects of the present disclosure are detailed in the sections that follow.

2. VDI System Environment

Figure 1A:
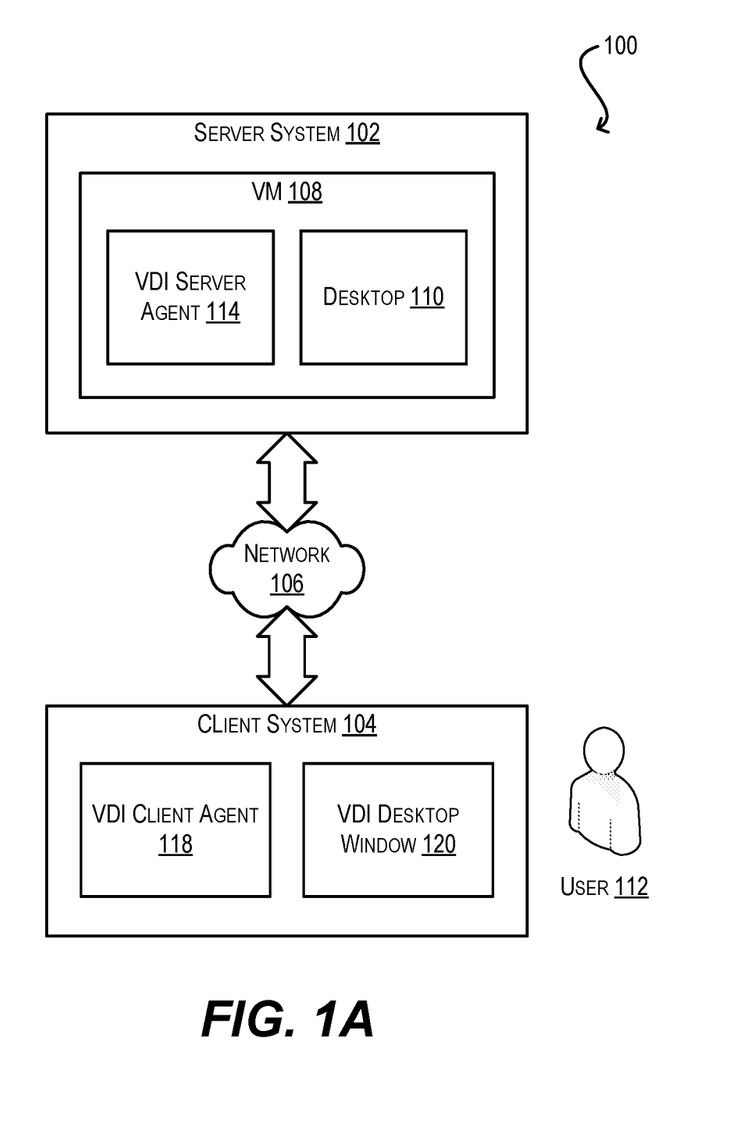
FIG. 1A depicts a conventional VDI system environment.

FIG. 1A is a simplified block diagram of a conventional VDI system environment 100 in which embodiments of the present disclosure may be implemented. As shown, VDI system environment 100 includes a server system 102 that is communicatively coupled with a client system 104 via a network 106. Although only a single server system and client system are shown, any number of these entities may be supported. Server system 102 is configured to run a VM 108 that hosts a desktop 110 of a user 112 of client system 104. As used herein, the term "desktop" refers to a computing environment in which a user can launch, interact with, and manage the user's applications, settings, and data. A VDI server agent 114 of VM 108 is configured to communicate, via a remoting protocol, with a corresponding VDI client agent 118 running on client system 104 and thereby enable user 112 to view and interact with server-side desktop 110 within a client-side VDI desktop window 120.

As noted in the Background section, the ability to accelerate the rendering of 3D graphics in VDI desktops such as desktop 110 is becoming increasingly important with the proliferation of graphics-intensive desktop applications. However, existing approaches for implementing such 3D graphics acceleration suffer from poor performance and limited functionality (e.g., softGPU), or require deploying GPU hardware on the server side (e.g., vSGA, vDGA, and vGPU), which can be prohibitively expensive for large-scale VDI deployments.

Figure 1B:
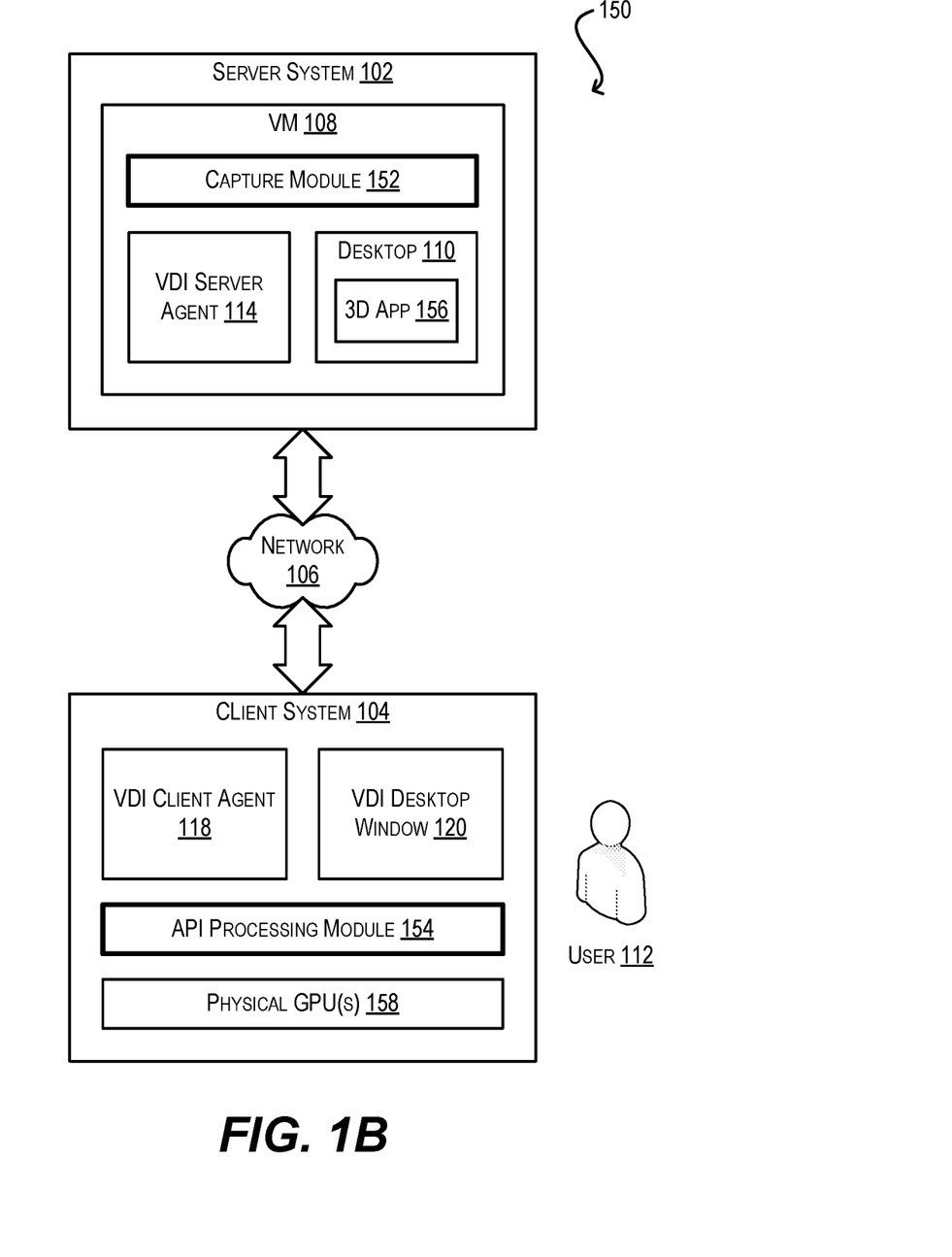
FIG. 1B depicts a VDI system environment according to an embodiment.

To address these and other similar issues, FIG. 1B depicts a modified version (150) of VDI system environment 100 that includes a novel capture module 152 within server-side VM 108 and a novel API processing module 154 on client system 104. As described in further detail below, components 152 and 154 can work in concert to implement 3D API redirection—in other words, the redirection of 3D APIs calls made by a 3D application 156 of desktop 110 to client system 104 for execution by one or more physical GPUs 158 residing on client system 104. This 3D API redirection solution provides better rendering performance and superior compatibility with modern 3D graphics APIs (e.g., OpenGL, Direct3D, etc.) than CPU-based approaches like SoftGPU. At the same time, since 3D API redirection leverages client-side (rather than server-side) GPU hardware, this solution is significantly less expensive for companies to deploy than server GPU-based approaches like vSGA, vDGA, vGPU, and so on.

It should be appreciated that FIGS. 1A and 1B are illustrative and not intended to limit embodiments of the present disclosure. For example, the entities shown in these figures may be arranged according to different configurations or may include sub-components and/or functions that are not specifically described. One of ordinary skill in the art will recognize other variations, modifications, and alternatives.

3. High-Level Redirection Workflow

Figure 2A:
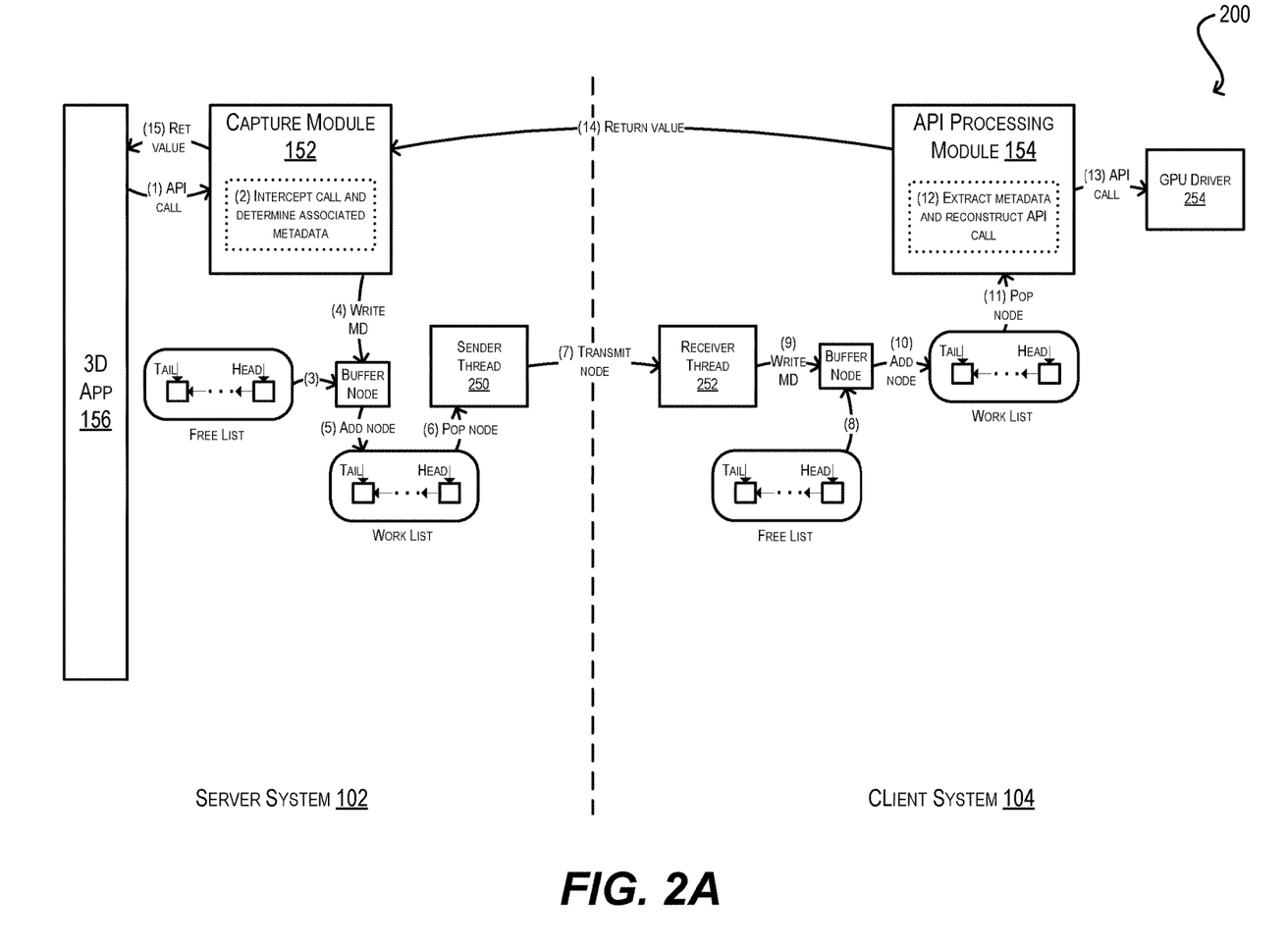
FIGS. 2A and 2B depict a high-level workflow for implementing 3D API redirection according to an embodiment.

To clarify how 3D API redirection works, FIG. 2A depicts a workflow 200 of the high-level processing that may be performed by capture module 152 and API processing module 154 of FIG. 1B to accelerate 3D graphics operations performed by 3D application 156 within desktop 110 according to an embodiment. Workflow 200 assumes that capture module 152 interacts with a server-side sender thread 250 and API processing module 154 interacts with a client-side receiver thread 252 to facilitate the transfer of 3D API-related information between server system 102 and client system 104. Workflow 200 also assumes that client system 104 includes a GPU driver 254 that serves as a software interface to client-side physical GPU(s) 158.

Starting with step (1), 3D application 156 can invoke (i.e., call) a 3D API during its runtime operation. The 3D API will typically be part of a standardized library of 3D graphics APIs, such as OpenGL or Direct3D, that facilitates the rendering of 3D graphics.

At step (2), capture module 152 can intercept the 3D API call made at step (1) and determine metadata associated with the call. This metadata can include, among other things, the API name and the input parameter values. Capture module 152 can then retrieve a buffer node from a queue of free buffer nodes (i.e., the free list) (step (3)), write the metadata into the buffer node (step (4)), and place the buffer node into a work buffer queue (.e., the work list) for FIFO (first-in-first-out) processing by sender thread 250 (step (5)).

In one set of embodiments, capture module 152 may add the buffer node to the work list as soon as the metadata is written to the node. In other embodiments, capture module 152 can pack metadata for sequential 3D API calls made by 3D application 156 into the buffer node until a threshold amount of the node is full, and can add the buffer node to the work list when the threshold is reached (or a determination is made that the most recent API call must be processed immediately). This optimization is discussed in further detail in section 6.1 below.

Once a buffer node has been placed in the work list by capture module 152 and reaches the head of the work list, sender thread 250 can pop the buffer node from the work list and transmit its contents to client system 104 (steps (6)-(7)). Although not shown, sender thread 250 can also pass the processed node back to the end of the free list for further use by capture module 152.

Receiver thread 252 of client system 104 can then receive the metadata sent by sender thread 250, retrieve a free buffer node from a client-side free list, write the received metadata into the buffer node, and add the buffer node into a client-side work list (steps (8)-(10)).

Once this buffer node reaches the head of the client-side work list, API processing module 154 can pop the node from the work list, extract the metadata from the node, and reconstruct the API call originally made by 3D application 156 using the extracted metadata (steps (11)-(12)). API processing module 154 can subsequently pass the reconstructed API call to GPU driver 254, thereby causing the API to be executed by client-side physical GPU(s) 158 (step (13)).

Finally, if a particular API call generates one or more result values, API processing module 154 can pass the result value(s) back to capture module 152 (step (14)), which in turn can forward the result value(s) to 3D application 156, thus completing the API's execution cycle (step (15)).

It should be noted that many 3D APIs are closely associated with a "targeting window," which is a desktop window in which 3D content is rendered; for example, 3D application 156 may call a sequence of 3D APIs for creating a targeting window within desktop 110 and performing rendering operations within the window. To ensure that such APIs can be properly redirected to the client system and the results of the APIs can be displayed on the client side, a "shadow window" mechanism can be implemented (see FIG. 2B) that involves creating a client-side targeting window (i.e., shadow window 256 in FIG. 2B) corresponding to the server-side targeting window and executing 3D API calls directed to the server-side targeting window against shadow window 256. Per FIG. 2B, user input events that are directed to the shadow window can be handled by a client-side event thread 258 and the user input events can be passed back to a server-side user input receive module 260 (step (16)), which can in turn forward the events to 3D application 156 (step (17)). The details for implementing this shadow window mechanism are described in section 4 below.

Figure 2B:
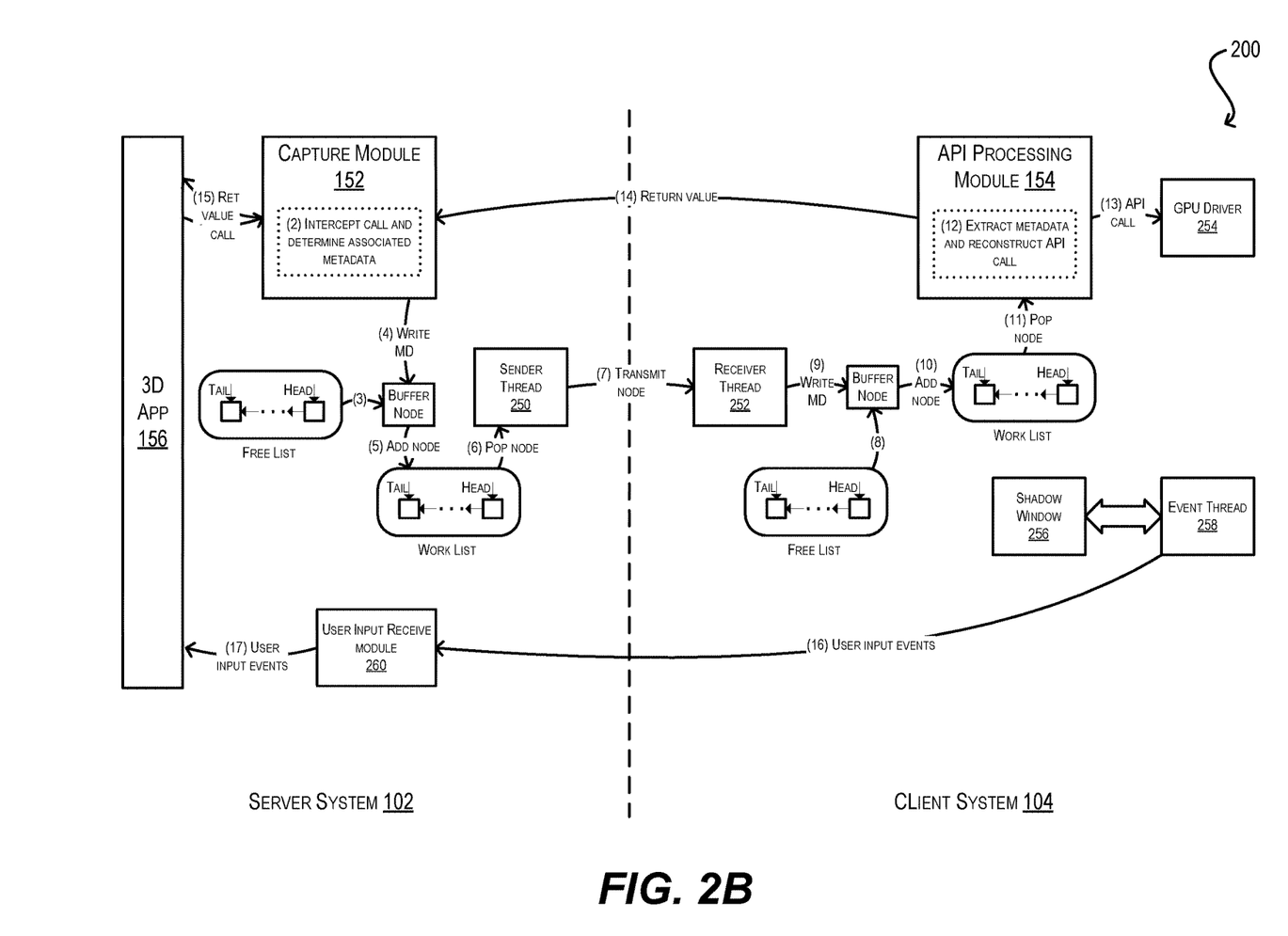

In addition, various other enhancements and optimizations can be implemented on top of the high-level redirection workflow of FIGS. 2A/2B to handle specific scenarios (e.g., use of pointers as API parameters) or to improve the overall performance and efficiency of the solution. These enhancements and optimizations are described in Sections 5 and 6 below.

4. Redirection of 3D API Calls Associated with a Targeting Window

Figure 3:
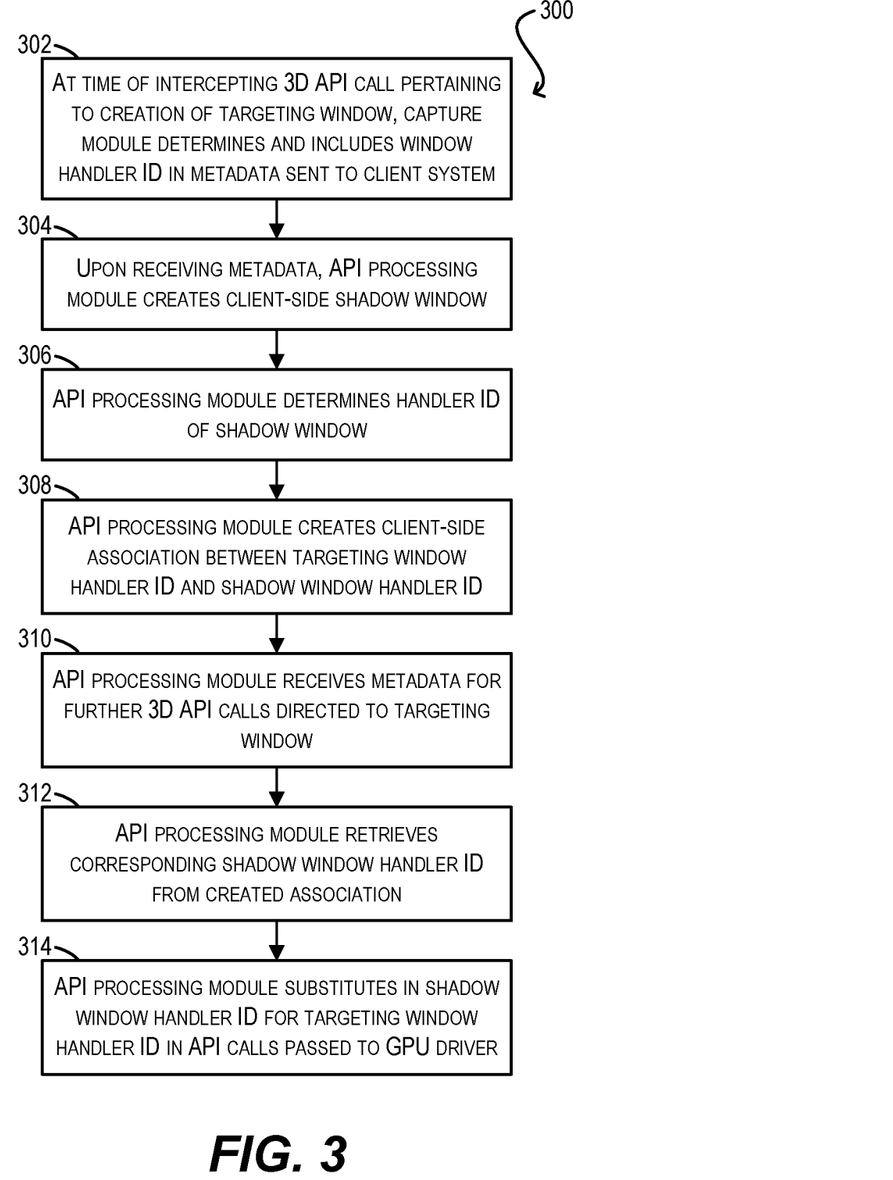
FIG. 3 depicts a flowchart for implementing a client-side shadow window according to an embodiment.

FIG. 3 depicts a flowchart 300 for implementing the shadow window mechanism discussed with respect to FIG.

2B and thereby handling the redirection of 3D API calls associated with a targeting window according to an embodiment.

Starting with block 302, at the time of intercepting a call to a 3D API that specifically pertains to the creation of a targeting window in desktop 110 (e.g., OpenGL's wglCreateContext), capture module 152 can determine and include an identifier (ID) of the targeting window's handler in the API call metadata sent to client system 104.

At block 304, upon receiving this metadata, API processing module 154 can create a client-side shadow window (i.e., shadow window 256 of FIG. 2B) corresponding to the server-side targeting window. API processing module 154 can perform this step by passing the window creation API call to GPU driver 254. API processing module 154 can then determine the handler ID of the created shadow window and create a client-side association between the handler ID of the shadow window and the handler ID of the server-side targeting window (blocks 306-308).

At some later point in time, API processing module 152 can receive, from server system 102, metadata for further 3D API calls that are directed to the server-side targeting window (and thus include the handler ID of that window within the metadata) (block 310). In these cases, API processing module 154 can retrieve the corresponding handler ID for the client-side shadow window from the locally-stored association created earlier (block 312) and substitute in the shadow window handler ID for the targeting window handler ID when passing the 3D API calls to GPU driver 254 (block 314). In this way, API processing module 154 can cause these 3D API calls to be executed with respect to the shadow window rather than the original targeting window.

In certain embodiments, the targeting window is invisible when initially created; it is only made visible when a following API is called that indicates 3D content needs to be shown in the window (e.g., wglMakeCurrent).

4.1 Placing/Sizing the Shadow Window

Figure 4:
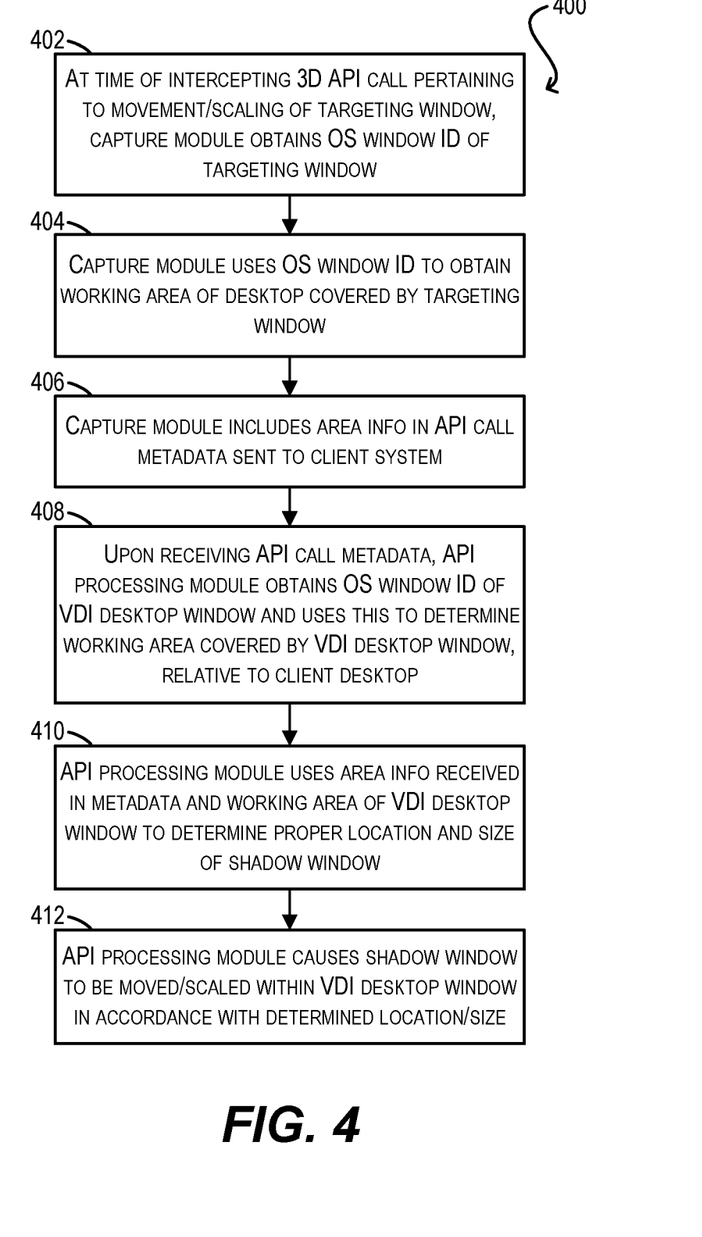
FIG. 4 depicts a flowchart for placing/sizing the shadow window according to an embodiment.

For a seamless user experience, the client-side shadow window should ideally cover the same area within client-side VDI desktop window 120 as the server-side targeting window within server-side desktop 110. FIG. 4 depicts a flowchart 400 for implementing this according to an embodiment.

At block 402, at the time of intercepting a call to a 3D API that pertains to the display or movement/scaling of the server-side targeting window (e.g., OpenGL's wglMakeCurrent or wglSwapBuffers), capture module 152 can use the targeting window's handler ID to obtain, via an OS-level API, the corresponding OS window ID of the targeting window.

At block 404, capture module 152 can use this OS window ID to obtain, from the OS, the working area of desktop 110 that is currently covered by the targeting window. For example, in embodiments where the OS is Windows, capture module 152 can perform this step by calling the Windows getClientRect API. The area information will be relative to the dimensions of desktop 110. Capture module 152 can then include this area information in the metadata for the API call that is sent to client system 104 (block 406).

On the client side, upon receiving the API call metadata, API processing module 154 can obtain the OS window ID of VDI desktop window 120 and use that to determine the working area covered by window 120, relative to the client desktop (block 408). API processing module 154 can then use (1) the working area of the targeting window received from server system 102 and (2) the working area of VDI desktop window 120 to determine the proper location and size of the client-side shadow window, such that the shadow window covers the same area within VDI desktop window 120 as the server-side targeting window within desktop 110 (block 410).

Finally, at block 412, API processing module 154 can cause the shadow window to be moved/scaled within VDI desktop window 120 in accordance with the determined location/size. In various embodiments, this process can be repeated on a per-frame basis for each subsequent API call made by 3D application 156 that moves or scales the server-side targeting window, thereby ensuring that the client-side shadow window is also moved/scaled correspondingly in a smooth fashion.

5. Handling Pointer Parameters

Some 3D APIs specify the use of pointers, rather than explicit data values, as one or more input parameters to the APIs. When redirecting such 3D APIs, it is not possible to simply pass the pointers identified by 3D application 156 to client system 104, since the pointer parameters point to locations in system memory that are only valid on server system 102 (and thus are invalid on client system 104).

To solve this, in certain embodiments capture module 152 can read out the data pointed to by each pointer and include the data itself, rather than the pointer to the data, in the API call metadata that is transmitted to client system 104. For example, consider the OpenGL API glCallLists, which has an input parameter GLvoid *lists which is a pointer to a list of values. In this case, capture module 152 can refer to the other two input parameters to the API (GLenum type and GLsizei n) to determine the type and size of the data in each entry of the list. Capture module 152 can then read out the data entries starting from the pointer position and cause this data to be transferred to the client side.

For some special OpenGL APIs such as glColorPointer, glVertexPointer, and glTexCoordPointer, capture module 152 cannot extract the data pointed to by their pointer parameters while the APIs are executing because capture module 152 does not know the data sizes at that time; rather, capture module 152 only knows the data start addresses (i.e., the pointers themselves). The pointed-to data for those pointers generally need to be obtained via other OpenGL APIs—for example, individual normal, vertex, color, and texture coordinate pointers should be constructed by calling glDrawElements or glDrawArrays.

In these specific scenarios, at the time of intercepting a call to glDrawElements, capture module 152 can determine the data sizes of the normal, vertex, color, and texture coordinate pointers that will be used as inputs to the corresponding glColorPointer, glVertexPointer, and glTexCoordPointer APIs, read out that data, and send it to client system 104. Client system 104 can then copy the transferred data values to corresponding pointer locations on the client side so that the APIs can be executed correctly by GPU(s) 158.

6. Optimizations 6.1 Buffer Mechanism

As mentioned with respect to the high-level workflow of FIG. 2A, capture module 152 is configured to write metadata for API calls made by 3D application 156 to buffer nodes, which are then added to a work list and processed by sender thread 250.

To improve performance and efficiency, in certain embodiments capture module 152 can refrain from placing the metadata for a single API call into a buffer node and then immediately placing the buffer node into the work list for transmission. Instead, capture module 152 can write the metadata for multiple sequential API calls made by 3D application 156 into a single buffer node, until the consumed space in the node reaches a predefined threshold (e.g., a percentage of the fixed size of the buffer node). When this threshold is reached, the buffer node can be added to the work list for transmission by sender thread 250. This approach reduces the number of thread switches needed between capture module 152 and sender thread 250 and also reduces the number of discrete network transmissions between server system 102 and client system 104, resulting in improved network throughput.

One caveat to the foregoing optimization is that any 3D API calls for which 3D application 156 is waiting for a return value should be transmitted immediately to client system 104 (so that the application can continue with its execution as soon as possible). Accordingly, in cases where capture module 152 encounters such an API call, capture module 152 can pack the metadata for the API call into the current buffer node and can immediately place the buffer node into the work list, even if the used space in the node has not yet reached the threshold. This ensures that the API is executed on the client side and the return value is provided to 3D application 156 without significant delay.

6.2 Return Value Acceleration and Return Value Cache

Some 3D APIs output a return value that may not be critical to the operation of the calling 3D application; for example, the OpenGL API wglSwapBuffers outputs a return value that is informational (i.e., it indicates execution success or failure). In various embodiments, capture module 152 can maintain a list of these 3D APIs and, when intercepting an API on the list, can immediately return a fixed value to 3D application 156, in addition to redirecting the API call to the client side. This optimization (referred to as "return value acceleration") avoids the need for 3D application 156 to wait for a return value to be sent from client system 104, which in turn reduces the latency of the API execution cycle.

Other 3D APIs output return values that do not necessarily change for each API invocation, and/or output the same return value for a given set of input parameter values. Examples of such APIs include OpenGL's glGetUniformLocationARB and glGetAttribLocationARB. For these particular APIs, capture module 152 can construct and maintain a server-side "return value cache" (i.e., hash map) that uses a string of the API input parameter value(s) as a key and the return value as the map value. When an API in this category is first called, the return value output by the API can be stored in the API's hash map; then, when the API is called again, capture module 152 can search the API's hash map with the input parameter string. If the search result is non-null, capture module 152 knows that a return value has already been cached and can provide that return value to 3D application 156, without redirecting the API call to the client side. On the other hand, if the search result is null, capture module 162 can redirect the API call per its normal processing and can store the generated return value in the hash map.

6.3 Large Data Cache

Some 3D APIs specify, as input parameters, pointers to large data sets such as texture data, vertex data, and so on. If a particular texture or vertex data set is passed as input multiple times across different API calls, that data set will be transferred multiple times from server system 102 to client system 104 (one per call), which can unnecessarily slow down the overall redirection workflow and consume large amounts of network bandwidth.

To avoid these issues, in certain embodiments the server and client systems respectively can implement a LRU (least recently used) cache that stores large data sets and their corresponding hash values (e.g., MD5 values). If the hash value of a data set that is provided as input to a 3D API call exists in the server-side LRU cache, server system 102 can transmit the data set's hash value (rather that the data set itself) as part of the API call metadata to client system 104. Client system 104 can then use the hash value to retrieve the data set from the client-side LRU cache and use that locally-retrieved data set to execute the API call.

6.4 Data Compression

Upon filling a given buffer node with the metadata of one or more API calls, capture module 152 can compress the contents of the node before transmission to client system 104, thereby reducing the amount of data transferred across the network. Capture module 152 can use any one of various data compression algorithms known in the art for this purpose, such as the Snappy algorithm. For relatively small buffer node sizes (e.g., 1 MB), the time needed to compress the buffer node contents should not significantly affect overall redirection performance.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    intercepting, by a capture module of a server system, a call to a 3D application programming interface (API) made by a 3D application running within a virtual machine (VM) on the server system, the VM hosting a desktop that is presented to a user of a client system;
    upon intercepting the call to the 3D API made by the 3D application running within the VM, determining, by the capture module, that the 3D API is in a list of 3D APIs maintained by the server system, each 3D API in the list of 3D APIs being an API that outputs an informational return value that is not needed by the 3D application in order to continue its operation;
    in response to determining that the 3D API is in the list of 3D APIs which output informational return values, immediately returning, by the capture module, a fixed return value to the 3D application, wherein the fixed return value is a predetermined value that is not generated as a result of executing the 3D API by the client system, and wherein the returning of the fixed return value to the 3D application enables the 3D application to proceed with its operation without waiting for a return value for the 3D API to be sent by the client system; and
    in addition to returning the fixed return value to the 3D application:
        determining, by the capture module, metadata associated with the call, the metadata including a name of the 3D API and one or more input parameter values for one or more input parameters to the call;
        determining, by the capture module, that a hash value for an input parameter value in the one or more input parameter values exists in a server-side cache of the server system;
        transmitting, by the capture module, the metadata to the client system, wherein the transmitted metadata includes the hash value, and wherein the client system is configured to reconstruct the call to the 3D API using the transmitted metadata and the hash value and execute the reconstructed call using one or more physical GPUs (graphics processing units) residing on the client system; and
        receiving, by the capture module from the client system, a return value output by the client system as a result of executing the reconstructed call.

2. The method of claim 1 wherein transmitting the metadata to the client system comprises:
    retrieving a buffer node from a queue of free buffer nodes;
    adding the metadata to the buffer node; and
    if an amount of used space in the buffer node has reached a threshold, placing the buffer node in a queue of processed buffer nodes for transmission to the client system.

3. The method of claim 1 wherein an input parameter in the one or more input parameters is a pointer, and wherein determining the metadata comprises:
    identifying data pointed to by the pointer on the server system; and
    including the data in the metadata transmitted to the client system.

4. The method of claim 1 further comprising, prior to transmitting the metadata to the client system:
    checking whether a string comprised of the one or more input parameter values is found in a hash map maintained on the server system; and
    if the string is found in the hash map, providing a return value mapped to the string in the hash map to the 3D application, without transmitting the metadata to the client system.

5. The method of claim 1 wherein the 3D API is an API to create a server-side targeting window within the desktop on the server system, and wherein the method further comprises:
    determining, by the server system, a server-side handler identifier of a window handler for the server-side targeting window; and
    including, by the server system, the server-side handler identifier in the metadata transmitted to the client system.

6. The method of claim 5 wherein upon receiving the metadata, the client system:
    creates a client-side shadow window corresponding to the server-side targeting window;
    determines a client-side handler identifier of a window handler for the client-side shadow window; and
    creates a client-side association between the server-side handler identifier and the client-side handler identifier.

7. The method of claim 6 wherein the method further comprises, subsequent to creation of the client-side shadow window and the client-side association:
    intercepting, by the server system, a second call to a second 3D API made by the 3D application running within the VM on the server system, the second call being directed to the server-side targeting window;
    determining second metadata associated with the second call, the second metadata including the server-side handler identifier; and
    transmitting the second metadata to the client system.

8. The method of claim 7 wherein upon receiving the second metadata, the client system:
    identifies the server-side handler identifier in the received second metadata;
    retrieves, based on the identified server-side handler identifier, the client-side handler identifier from the client-side association;

reconstructs the second call to the second 3D API using the second metadata, the reconstructing of the second call including substituting the server-side handler identifier with the client-side handler identifier; and executes the reconstructed second call using the one or more physical GPUs residing on the client system.

9. The method of claim 7 wherein the second 3D API pertains to a movement or a scaling of the server-side targeting window within the desktop on the server system, and wherein determining the second metadata comprises:

obtaining, by the server system, a server-side operating system (OS) window identifier of the server-side targeting window;

obtaining, by the server system using the server-side OS window identifier, a first working area of the desktop that is currently covered by the server-side targeting window; and including, by the server system, the first working area in the second metadata.

10. The method of claim 9 wherein upon receiving the second metadata, the client system:

obtains a client-side OS window identifier of a remote desktop window on the client system configured to present the desktop;

determines, using the client-side OS window identifier, a second working area of a client desktop on the client system that is currently covered by the remote desktop window; and computes, using the first working area included in the received second metadata and the second working area, a location and size for the client-side shadow window within the remote desktop window, such that the client-side shadow window covers a same area within the remote desktop window as the server-side targeting window within the desktop on the server system.

11. The method of claim 1 wherein the list of 3D APIs which output informational return values comprises 3D APIs which output either a success return value or a failure return value.

12. A non-transitory computer readable storage medium having stored thereon program code executable by a server system having a capture module that performs a method comprising:

intercepting a call to a 3D application programming interface (API) made by a 3D application running within a virtual machine (VM) on the server system, the VM hosting a desktop that is presented to a user of a client system;

upon intercepting the call to the 3D API made by the 3D application running within the VM, determining that the 3D API is in a list of 3D APIs maintained by the server system, each 3D API in the list of 3D APIs being an API that outputs an informational return value that is not needed by the 3D application in order to continue its operation;

in response to determining that the 3D API is in the list of 3D APIs which output informational return values, immediately returning a fixed return value to the 3D application, wherein the fixed return value is a predetermined value that is not generated as a result of executing the 3D API by the client system, and wherein the returning of the fixed return value to the 3D application enables the 3D application to proceed with its operation without waiting for a return value for the 3D API to be sent by the client system; and in addition to returning the fixed return value to the 3D application:

determining metadata associated with the call, the metadata including a name of the 3D API and one or more input parameter values for one or more input parameters to the call;

determining that a hash value for an input parameter value in the one or more input parameter values exists in a server-side cache of the server system;

transmitting the metadata to the client system, wherein the transmitted metadata includes the hash value, and wherein the client system is configured to reconstruct the call to the 3D API using the transmitted metadata and the hash value and execute the reconstructed call using one or more physical GPUs (graphics processing units) residing on the client system; and receiving, from the client system, a return value output by the client system as a result of executing the reconstructed call.

13. The non-transitory computer readable storage medium of claim 12 wherein transmitting the metadata to the client system comprises:

retrieving a buffer node from a queue of free buffer nodes;

adding the metadata to the buffer node; and if an amount of used space in the buffer node has reached a threshold, placing the buffer node in a queue of processed buffer nodes for transmission to the client system.

14. The non-transitory computer readable storage medium of claim 12 wherein an input parameter in the one or more input parameters is a pointer, and wherein determining the metadata comprises:

identifying data pointed to by the pointer on the server system; and including the data in the metadata transmitted to the client system.

15. The non-transitory computer readable storage medium of claim 12 wherein the method further comprises, prior to transmitting the metadata to the client system:

checking whether a string comprised of the one or more input parameter values is found in a hash map maintained on the server system; and if the string is found in the hash map, providing a return value mapped to the string in the hash map to the 3D application, without transmitting the metadata to the client system.

16. A server system comprising:

a processor; and a non-transitory computer readable medium having stored thereon program code for a capture module that, when executed by the processor, causes the processor to:

intercept a call to a 3D application programming interface (API) made by a 3D application running within a virtual machine (VM) on the server system, the VM hosting a desktop that is presented to a user of a client system;

upon intercepting the call to the 3D API made by the 3D application running within the VM, determine that the 3D API is in a list of 3D APIs maintained by the server system, each 3D API in the list of 3D APIs being an API that outputs an informational return value that is not needed by the 3D application in order to continue its operation;

in response to determining that the 3D API is in the list of 3D APIs which output informational return values, immediately return a fixed return value to the 3D application, wherein the fixed return value is a predetermined value that is not generated as a result of executing the 3D API by the client system, and wherein the returning of the fixed return value to the 3D application enables the 3D application to proceed with its operation without waiting for a return value for the 3D API to be sent by the client system; and in addition to returning the fixed return value to the 3D application:
- determine metadata associated with the call, the metadata including a name of the 3D API and one or more input parameter values for one or more input parameters to the call;
- determine that a hash value for an input parameter value in the one or more input parameter values exists in a server-side cache of the server system;
- transmit the metadata to the client system, wherein the transmitted metadata includes the hash value, and wherein the client system is configured to reconstruct the call to the 3D API using the transmitted metadata and the hash value and execute the reconstructed call using one or more physical GPUs (graphics processing units) residing on the client system; and
- receive, from the client system, a return value output by the client system as a result of executing the reconstructed call.

17. The server system of claim 16 wherein transmitting the metadata to the client system comprises:
- retrieving a buffer node from a queue of free buffer nodes;
- adding the metadata to the buffer node; and
- if an amount of used space in the buffer node has reached a threshold, placing the buffer node in a queue of processed buffer nodes for transmission to the client system.

18. The server system of claim 16 wherein an input parameter in the one or more input parameters is a pointer, and wherein determining the metadata comprises:
- identifying data pointed to by the pointer on the server system; and
- including the data in the metadata transmitted to the client system.

19. The server system of claim 16 wherein the program code further causes the processor to, prior to transmitting the metadata to the client system:
- check whether a string comprised of the one or more input parameter values is found in a hash map maintained on the server system; and
- if the string is found in the hash map, provide a return value mapped to the string in the hash map to the 3D application, without transmitting the metadata to the client system.

* * * * *